(12) United States Patent
Haga

(10) Patent No.: US 7,344,382 B2
(45) Date of Patent: Mar. 18, 2008

(54) FINE TERMINAL, ITS MANUFACTURING METHOD, AND CONTACT SHEET

(75) Inventor: Tsuyoshi Haga, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 85 days.

(21) Appl. No.: 10/553,748

(22) PCT Filed: Dec. 9, 2004

(86) PCT No.: PCT/JP2004/018394

§ 371 (c)(1),
(2), (4) Date: Oct. 18, 2005

(87) PCT Pub. No.: WO2005/057734

PCT Pub. Date: Jun. 23, 2005

(65) Prior Publication Data

US 2006/0138676 A1    Jun. 29, 2006

(30) Foreign Application Priority Data

Dec. 12, 2003 (JP) .............................. 2003-414280

(51) Int. Cl.
*H01R 12/00* (2006.01)
(52) U.S. Cl. ........................................ 439/66; 439/700
(58) Field of Classification Search ................ 439/66, 439/700
See application file for complete search history.

(56) References Cited

U.S. PATENT DOCUMENTS

| 4,307,928 | A | 12/1981 | Petlock, Jr. | |
|---|---|---|---|---|
| 6,255,727 | B1 | 7/2001 | Khoury | |
| 6,359,455 | B1 | 3/2002 | Takekoshi | |
| 6,447,343 | B1 * | 9/2002 | Zhang et al. | 439/700 |
| 6,517,362 | B2 | 2/2003 | Hirai et al. | |
| 6,672,876 | B1 | 1/2004 | Takekoshi | |
| 6,763,581 | B2 | 7/2004 | Hirai et al. | |
| 2001/0023140 | A1 | 9/2001 | Saijo et al. | |
| 2002/0060579 | A1 | 5/2002 | Haseyama et al. | |
| 2004/0075454 | A1 | 4/2004 | Hirata et al. | |

FOREIGN PATENT DOCUMENTS

| JP | 7-021598 | 1/1995 |
|---|---|---|
| JP | 9-251032 | 9/1997 |
| JP | 11-162270 | 6/1999 |
| JP | 2000-241457 A | 9/2000 |
| JP | 2001-056345 A | 2/2001 |
| JP | 2001-091539 A | 4/2001 |
| JP | 2001-235486 A | 8/2001 |
| JP | 2001-267029 A | 9/2001 |

(Continued)

*Primary Examiner*—Truc Nguyen
(74) *Attorney, Agent, or Firm*—McDermott Will & Emery LLP

(57) ABSTRACT

A micro terminal for inspection or installation with high connection reliability is provided at lower cost. A micro terminal according to the present invention has electrical conduction between the micro terminal and an electrode of an electronic device or an inspection device and includes a columnar contactor in contact with the electrode. The contactor has a spring structure which is elastically deformed when pressed against the electrode. The contactor includes a protrusion protruding outwardly at its end in contact with the electrode and the shape of the protrusion has a part of a sphere or a part of a paraboloid of revolution.

13 Claims, 8 Drawing Sheets

FOREIGN PATENT DOCUMENTS

| | | |
|---|---|---|
| JP | 2001-332323 A | 11/2001 |
| JP | 2002-175859 A | 6/2002 |
| JP | 2003-121470 A | 4/2003 |
| JP | 2003-248018 A | 9/2003 |
| WO | WO 02/061439 A1 | 8/2002 |

* cited by examiner (a)

(b)

(a)

(b)

(a)  (b)

(a)

(b)

(c)

(a)

(b)

(c)

FINE TERMINAL, ITS MANUFACTURING METHOD, AND CONTACT SHEET

RELATED APPLICATION

This application is a national phase of PCT/JP2004/018394 filed on Dec. 9, 2004, which claims priority from Japanese Application No. 2003-414280 filed on Dec. 12, 2003, the disclosures of which Applications are incorporated by reference herein. The benefit of the filing and priority dates of the International and Japanese Applications is respectfully requested.

TECHNICAL FIELD

The present invention relates to a micro terminal that is pressed against an electrode of an electronic device including IC or LSI or the like to obtain electrical conduction, and to a method of fabricating the same. Further, the present invention relates to a contact sheet, an inspection device and an electronic device including the micro terminal.

BACKGROUND ART

For inspection of electrical conduction of an electronic device including IC or LSI or the like, a socket for inspection is used with a connection terminal pressed against an electrode of the electric device to take out an electrical signal from the electrode through the connection terminal. A connector for installation is used with a connection terminal pressed against a land electrode of an electric device to maintain electrical conduction through the connection terminal. The inspection socket and the installation connector are provided with the number of connection terminals corresponding to the number of electrodes of an electronic device for connection. As electrodes of an electric device increase in density, the connection terminals of the inspection socket and the installation connector are also required to increase in density.

As the connection terminal, for example, a connection terminal for BGA (Ball Grid Array) is known which has a planar spiral shape before connection to a ball-shaped electrode and, due to the connection to the ball-shaped electrode, the spiral deforms in accordance with the shape of the ball-shaped electrode (see Patent Document 1). The spiral terminal can address the densification of electrodes and has high connection reliability since it can ensure electrical conduction in accordance with the shape of a ball-shaped electrode.

A spiral terminal for inspection includes a volute terminal which has a spiral spring that is lower at its perimeter and higher toward its central portion, for example (see Patent Document 2). When a conical probe portion disposed at the end of the volute terminal is pressed against a planar electrode of a body to be inspected, it is ensured that the conical probe portion is connected to the planar electrode of the body to be inspected due to urging force of the spring.

Patent Document 1: Japanese Patent Laying-Open No. 2002-175859

Patent Document 2: Japanese Patent Laying-Open No. 2001-235486

DISCLOSURE OF THE INVENTION

Problems to be Solved by the Invention

The spiral terminal is fabricated by a mechanical processing method by winding up a plate-shaped body, a method combining lithography using ultra-violet ray of a wavelength of approximately 200 nm and plating, laser processing, etching or punching, for example. When the spiral terminal is fabricated by mechanical processing by winding up a plate-shaped body, however, there is a limit in making the spiral terminal smaller and it is difficult to fabricate a precise terminal accurately in large amount with excellent reproducibility. With a method such as lithography using ultra-violet ray, laser processing or punching, the aspect ratio is small since only a terminal of a thickness of not more than approximately 20 μm can be obtained.

Due to the small aspect ratio, when a stroke (the amount of deflection of a spring) is made larger to obtain a spiral terminal with high connection reliability, the spring becomes thinner and cannot conduct large current of at least 0.5 A. Further, due to the small aspect ratio, the number of spirals of the terminal becomes small. When the stroke is made larger, the contact load becomes smaller, and when the contact load is made larger, the stroke becomes smaller. Accordingly, only a micro terminal with low connection reliability can be obtained.

When an electrode of a body to be connected is plate-shaped, it is necessary for a connection terminal to have a convex structure to obtain high connection reliability. An additional process is required for processing into a convex structure after the spiral spring is formed, leading to reduced productivity and increased manufacturing cost. In addition, since it is not easy to process a micro spiral terminal into a convex structure, manufacturing yield is reduced. When the connection terminal is made conical with a sharp end and is pressed against a planar electrode of a body to be connected, the electrode of the body to be connected is likely to be damaged, since it is made of a soft material such as gold or solder. If the electrode is damaged in an inspection stage, the defect ratio in a subsequent installation stage is higher, leading to lower connection reliability. On the other hand, since the end of the connection terminal also tends to be deformed, stable electrical connection cannot be obtained for repeated use of a long period of time.

Since a conical protrusion structure can be formed only by mechanical processing, sequent processing is necessary, leading to increased manufacturing cost. In addition, when the conical protrusion structure is formed by mechanical processing, variation in the product is several tens of μm, causing variation in height, variation in stroke when in contact with an electrode, and variation in contact load, leading to reduced connection reliability.

One object of the present invention is to provide a micro terminal for inspection or installation with high connection reliability at reduced cost. Another object is to provide a contact sheet, an inspection device and an electronic device including the micro terminal.

MEANS FOR SOLVING THE PROBLEMS

A micro terminal according to the present invention has electrical conduction between the micro terminal and an electrode of an electronic device or an inspection device, characterized in that the micro terminal includes a columnar contactor in contact with the electrode, and the contactor has a spring structure which is elastically deformed by being pressed against the electrode, and the contactor includes a protrusion protruding outwardly at its end in contact with the electrode, and the shape of the protrusion has a part of a sphere or a part of a paraboloid of revolution.

Preferably, the contactor has a spiral spring structure or a structure in which a plurality of meandering springs are disposed from its perimeter portion toward its central portion. Further, preferably, the contactor has a structure in which its perimeter portion has a tubular ring structure. Preferably, the micro terminal has a contactor at each of opposing ends in contact with the electrode and the protrusion has a V-shaped groove opening toward the direction in which the protrusion protrudes. Preferably, the micro terminal is formed of nickel or a nickel alloy and has a coat layer including a precious metal or a precious metal alloy or polytetrafluoroethylene gold.

A method of fabricating a micro terminal according to the present invention is characterized in that the contactor of the micro terminal is fabricated by a method including the steps of: forming a resin mold by X-ray lithography; forming a layer including a metal material at the resin mold on an electrically conductive substrate by electroforming; polishing or grinding; forming a resin mold on the layer including a metal material by lithography; electroforming a layer including a metal material at the resin mold to form a protrusion protruding outwardly; removing the resin molds; and removing the electrically conductive substrate.

In another aspect, the method of fabricating the micro terminal according to the present invention is characterized in that the contactor of the micro terminal is fabricated by a method including the steps of: forming a resin mold by a metal mold; forming a layer including a metal material at the resin mold on an electrically conductive substrate by electroforming; polishing or grinding; forming a resin mold on the layer including a metal material by lithography; electroforming a layer including a metal material at the resin mold to form a protrusion protruding outwardly; removing the resin molds; and removing the electrically conductive substrate. Preferably, the protrusion formed is provided with a V-shaped groove formed by cutting with a dicer.

A contact sheet according to the present invention includes the above-described micro terminal, characterized in that the contact sheet has a hollow electrode penetrating the sheet in the thickness direction and a contactor on the hollow electrode and the hollow electrode has a hollow portion to accommodate the protrusion when the spring of the contactor makes a stroke. Preferably, the contact sheet is formed by joining the hollow electrode and the contactor by resistance welding.

An inspection device according to the present invention is characterized in that the inspection device has a socket including the above-described micro terminal and is used to inspect semiconductor in land grid array arrangement. An electronic device according to the present invention is characterized in that the electronic device has a connector including the above-described micro terminal and is connected to a land electrode.

EFFECTS OF THE INVENTION

Due to high aspect ratio, the micro terminal according to the present invention has high connection reliability since a spring can be made thicker and the elastic energy of the spring can be made larger while the terminal is very small. With a fabricating method according to the present invention, a micro connection terminal can be provided precisely, with high reproducibility and at reduced cost.

DESCRIPTION OF THE REFERENCE SIGNS

1$u$: spring, 1$t$: protrusion, 1$tc$: contact surface of the protrusion, 31, 91$a$, 91$c$: contactor, 32: substrate, 35: semiconductor, 38: transformer, 50: metal mold, 91: micro terminal, 91$b$: hollow electrode

BEST MODES FOR CARRYING OUT THE INVENTION (Micro Terminal)

Figure 1:
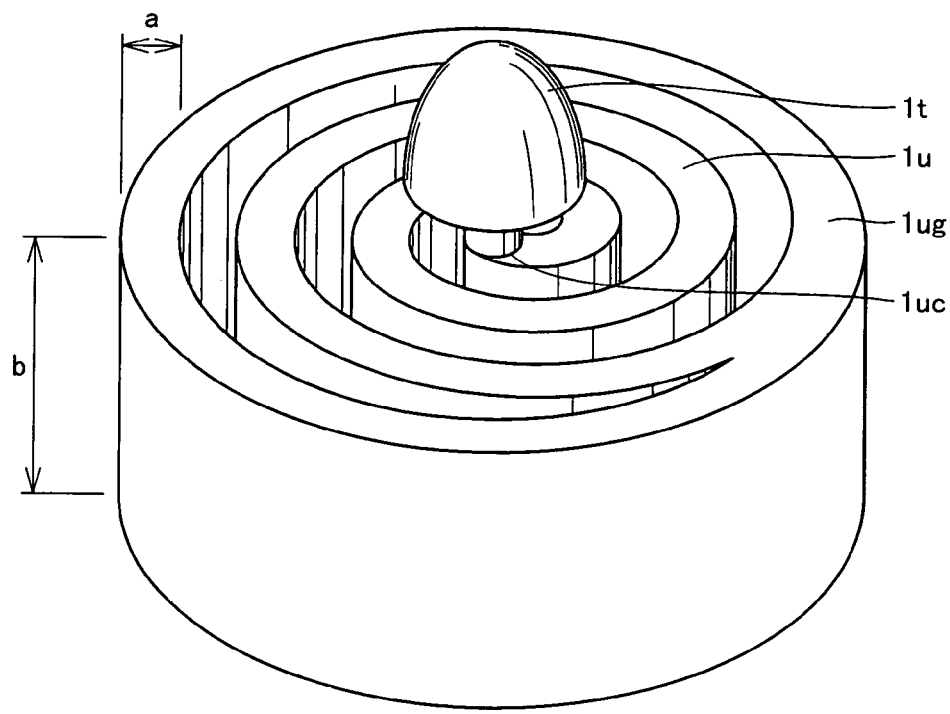
FIG. 1 shows the structure of a contactor in a micro terminal according to the present invention.
Figure 1:
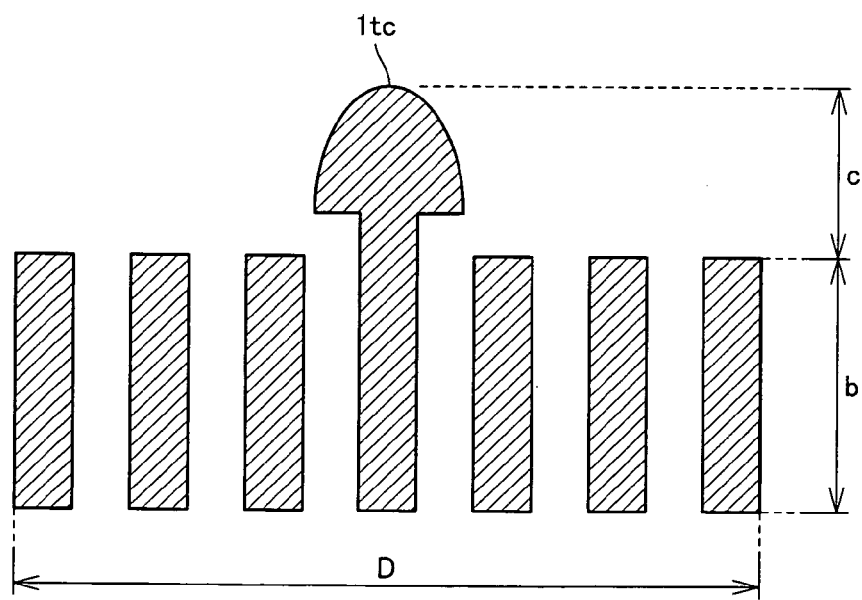

A micro terminal according to the present invention includes a columnar contactor in contact with an electrode and the contactor has a spring structure which is elastically deformed when pressed against the electrode. The contactor includes a protrusion protruding outwardly at its end in contact with the electrode. The shape of the protrusion has a part of a sphere or a part of a paraboloid of revolution. FIG. 1 shows a typical example of the contactor. (a) is a perspective view, and (b) is a cross-sectional view when the contactor is cut in a plane passing the center and parallel to the longitudinal direction. FIG. 1 shows a contactor having a spiral spring structure. The contactor has a columnar spring 1$u$ and a protrusion 1$t$ protruding outwardly at the center 1$uc$ of a spiral of spring 1$u$. Protrusion 1$t$ includes a contact surface 1$tc$ in contact with an electrode of an electronic device or an inspection device. Contact surface 1$tc$ has a shape of a part of a sphere or a part of a paraboloid of revolution.

Figure 6:
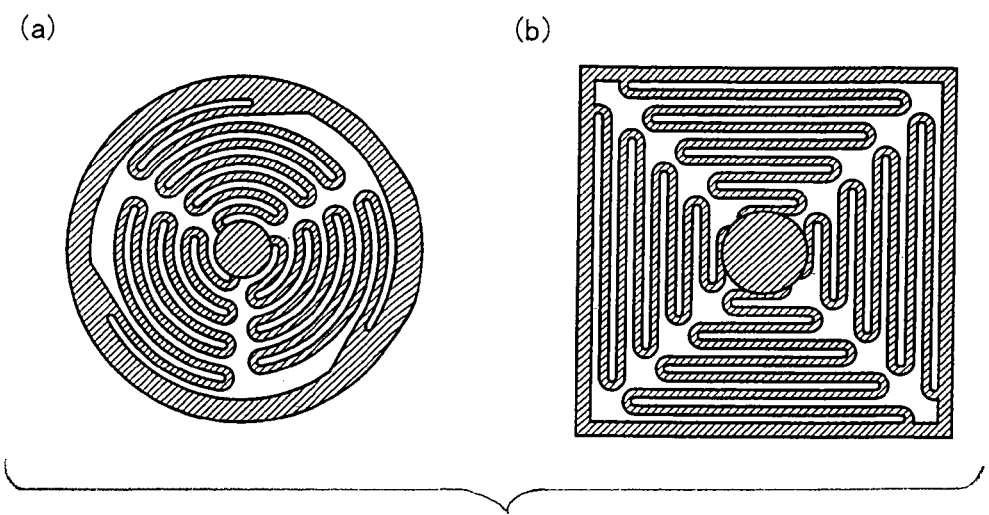
FIG. 6 is a cross-sectional view of the contactor in the micro terminal when the contactor is cut in a plane perpendicular to the longitudinal direction.

FIG. 6 shows another contactor. The contactor shown in FIG. 6 has a structure in which a plurality of meandering springs are disposed from the perimeter portion toward the central portion of the contactor (hereinafter referred to as a "gimbal spring structure"). Since current flows along the meandering springs in the spring shape, electromagnetic fields generated cancel each other and excellent high frequency property is obtained. (a) in FIG. 6 shows a contactor of a round shape as a whole and having three springs linked at the central portion. (b) shows a contactor of a square shape as a whole and having four springs linked at the central portion. When the contactor is square as a whole, the area occupied by a spring on a contact sheet of a connector for installation or a socket for inspection is larger, leading to better spring efficiency.

As with a conventional spiral terminal of a convex shape, when a micro terminal with a sharp conical end is pressed against a planar electrode or the like as a body to be connected, the terminal tends to be mechanically damaged and the end of the connection terminal is also deformed, lowering connection reliability. However, for the contactor in the micro terminal according to the present invention, the shape of protrusion $1t$ forms a part of a sphere or a part of a paraboloid of revolution, as shown in FIG. 1. Accordingly, an electrode of a body to be connected is not mechanically damaged. Even when repeatedly connected, the contactor is less likely to have variation in height because of the crushed end of the protrusion or lower stability of electrical connection because of change in the contact area. Even when the spiral terminal is obliquely connected to an electrode, predetermined connection condition can be maintained.

Preferably, a perimeter portion $1ug$ of columnar spring $1u$ has a tubular ring structure. When perimeter portion $1ug$ has a tubular ring structure, installation to a substrate is easy and the micro terminal can be grasped easily. Since the micro terminal can be grasped easily, it can be fixed firmly. Further, since there is no end of the spring at the perimeter portion, a substrate is less likely to be cut away by an end of the spiral spring even when repeatedly connected to an electrode, leading to high stability.

In the contactor according to the present invention, as shown in FIG. 1, the outer diameter D is not more than 1 mm and the thickness b of spiral spring $1u$ is 100–500 μm and the height c of protrusion $1t$ is 50–200 μm. Although FIG. 1 shows protrusion $1t$ with a neck, a protrusion without a neck is also included in the present invention. Further, FIG. 1 shows an example in which the cross section is almost circular when the contactor is cut in a plane perpendicular to the longitudinal direction. However, the cross section may be not only circular but also elliptical or partly deformed circular or a polygon such as a triangle or a rectangle. The polygon includes not only a polygon with pieces of the same length but also with pieces of different length.

Figure 2:
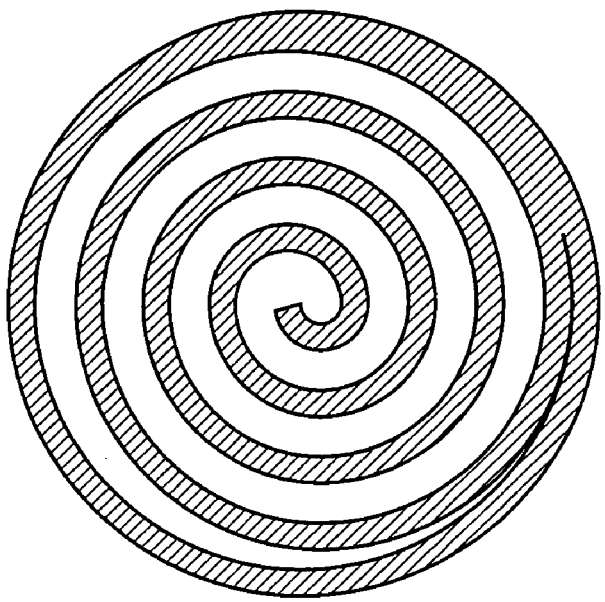
FIG. 2 is a cross-sectional view of the contactor in the micro terminal according to the present invention when the contactor is cut in a plane perpendicular to the longitudinal direction.
Figure 2:
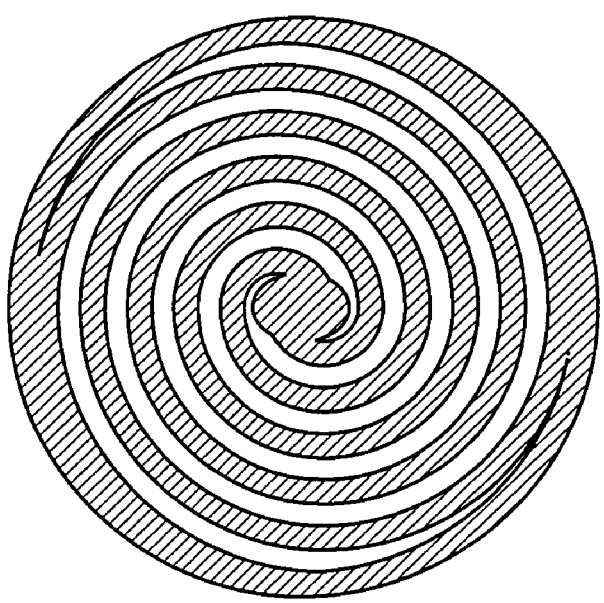

FIG. 2 shows an example in which the cross section is circular when the contactor according to the present invention is cut in a plane perpendicular to the longitudinal direction. (a) is a cross sectional view of a contactor with a spiral spring including one arm. (b) is a cross sectional view of a contactor with a spiral spring including two arms. A spiral spring including at least three arms is also included in the present invention. In the example of (b), the ends of the two arms are linked at the central portion and the linked portion has a protrusion (not shown).

Figure 7:
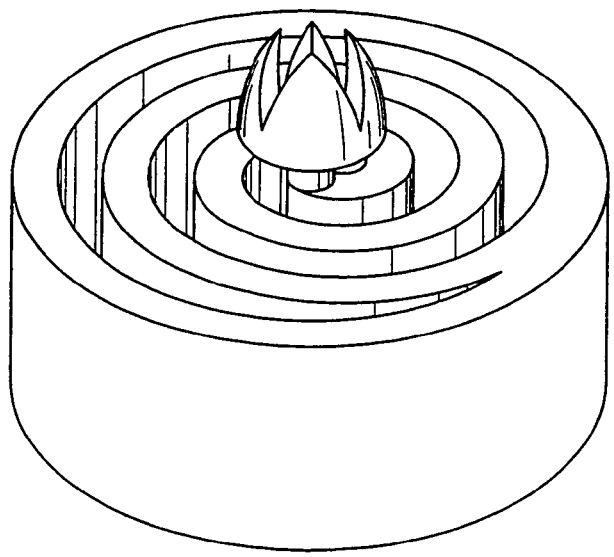
FIG. 7 shows the structure of the contactor in the micro terminal according to the present invention.

When the protrusion in the micro terminal has a V-shaped groove opening toward the protruding direction of the protrusion as shown in FIG. 7, the crown-shaped protrusion surrounds and contacts a solder bump of a solder bump electrode of small height as a body to be connected, producing a sufficient stroke to cause a necessary load and breaking an oxide film of the surface of the solder bump by the edge of the protrusion to obtain electrical conduction. Accordingly, excellent electrical contact with the surface of the solder bump is provided. Singular V-shaped groove or a plurality of V-shaped grooves may be effective, however, especially for the solder bump, grooves crossing orthogonally provide high connectivity.

FIG. 3(d) shows an example of a socket for inspection including the micro terminal according to the present invention. As shown in FIG. 3(d), a pair of contactors $31a$, $31b$ is disposed back to back to each other with respective protrusion facing outwardly and is fitted into a thorough hole of an electrically insulating substrate 32 with a hollow ring 39 therebetween. The hollow ring 39 ensures a space for the adjacent contactors $31a$, $31b$ to make a stroke and prevents the contactors from contacting each other even when they are deformed.

The socket for inspection shown in FIG. 3(d) is interposed between a semiconductor 35 and a transformer 38 of the measuring device for use. By being interposed between semiconductor 35 and transformer 38, the socket is connected to an electrode 36 of semiconductor 35 and an electrode 37 of transformer 38 with an appropriate contact load due to urging force of the spring. Accordingly, an electrical signal obtained from semiconductor 35 is led to the measuring device through transformer 38.

The micro terminal according to the present invention is useful as a micro terminal of a socket for inspection for semiconductor in land grid array arrangement and the like. Further, the micro terminal according to the present invention is useful as a micro terminal of a connector for an electronic device mounted on a land electrode of a communication device such as a mobile phone or an electronic device such as a personal computer. Preferably, an electrode of an inspection device or an electronic device is planar to obtain a secure connection with a contactor having a protrusion. However, an electrode having a convex or concave portion or a recess can be used as well.

FIG. 9(c) shows another example of a contact sheet of a socket for inspection and a connector for installation or the like. As shown in FIG. 9(c), the contact sheet includes a micro terminal 91 according to the present invention and has a hollow electrode $91b$ penetrating a sheet 92 in the thickness direction and contactors $91a$, $91c$ on hollow electrode $91b$. Hollow electrode $91b$ has a hollow portion such that a spring of contactors $91a$, $91c$ can make a stroke. In the example shown in FIG. 9(c), there is a pair of contactors $91a$, $91c$ on and under hollow electrode $91b$. Although micro terminal 91 has a contactor on both ends in contact with an electrode, a terminal having a contactor on one surface only is also effective and both are included in the present invention. In the example shown in FIG. 9(c), since the protrusion of contactors $91a$, $91c$ has a V-shaped groove structure, a solder bump electrode of lower height is preferable as an electrode for connection. Thus, the micro terminal according to the present invention is widely applicable since specifications of a contactor can be changed in accordance with a type of an electrode for connection.

(Method of Fabricating a Micro Terminal)

A method of fabricating a micro terminal according to the present invention is characterized in that a contactor in the micro terminal is fabricated by a method including the steps of: forming a resin mold by X-ray lithography; forming a layer including a metal material at the resin mold on an electrically conductive substrate by electroforming; polishing or grinding; forming a resin mold on the metal material layer by lithography; electroforming a layer including a metal material at the resin mold to form a protrusion protruding outwardly; removing the resin molds; and removing the electrically conductive substrate.

Since a spring portion constituting the contactor is fabricated by a method combining X ray and electroforming, higher aspect ratio can be obtained compared to lithography using UV, laser processing, etching or punching. For example, a spring with aspect ratio (b/a) of at least 2 shown in FIG. 1 can be easily fabricated and a spring with aspect ratio of at least 30 can be also fabricated. Due to high aspect ratio, a width a of the spring can be made smaller and the number of spirals can be made larger to provide a larger stroke. A thickness b of the spring can be made larger to make contact load larger. Thus, a micro terminal having high connection reliability can be fabricated.

More specifically, a micro terminal with a stroke of at least 100 μm and a contact load of 0.03N can be easily fabricated. A contact load of at least 0.1N can be also achieved. Thickness b can be made larger even when width a of the spring is small, so that large current of at least 0.5 A can be conducted.

In the present embodiment, a columnar spring portion is fabricated using X ray (of a wavelength of 0.4 nm) with a shorter wavelength than UV (of a wavelength of 200 nm), since high aspect ratio can be obtained. Preferably, X ray of highly directional synchrotron radiation (hereinafter referred to as "SR light") is used. With LIGA (Lithographie Galvanoformung Abformung) process using SR light, deep lithography is possible and a metal micro structure of several hundreds of μm in height can be fabricated accurately in the order of a micron and in large amount.

When a micro terminal is fabricated by mechanical processing by winding up a plate-shaped body for example, there is a limit in making the micro terminal smaller. The micro terminal is 1000 μm in thickness b and 500–1000 μm in diameter D even when it is smallest. With the micro terminal of this size, it is difficult to address semiconductor installed in higher density. Further, it is difficult to fabricate a precise micro terminal accurately with high reproducibility in large amount. For the present invention, a micro terminal of 100–500 μm in thickness b and 100–1000 μm in diameter D can be fabricated precisely, accurately and with high reproducibility, so that it is possible to address densification of an electronic device. Due to a fabrication method combining lithography and electroforming, a micro structure can be integrally formed, reducing the number of parts, parts cost and assembly cost.

Since the protrusion in contact with an electrode is formed by a method combining lithography and electroforming, the protrusion can be formed more easily compared to a method of performing mechanical convex processing after forming a spring, leading to high productivity and high product yield. The protrusion can be formed accurately, so that variation in height of a terminal can be reduced. Compared to fabrication by mechanical processing, variation in stroke and contact load can be reduced to around one tenth, providing high connection reliability.

Figure 4:
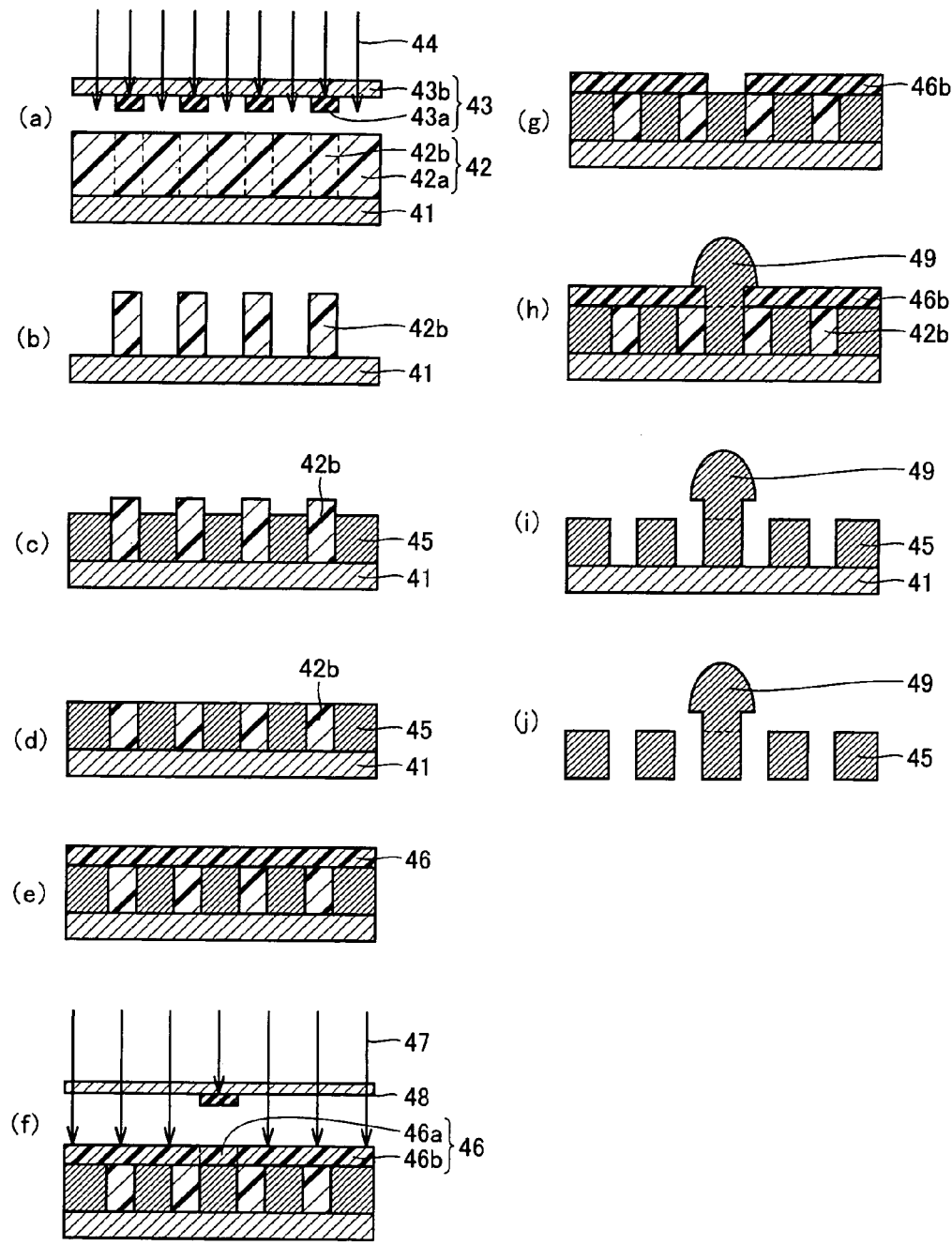
FIG. 4 shows processes of a method of fabricating the contactor in the micro terminal according to the present invention.

FIG. 4 shows a fabrication method according to the present invention. As shown in FIG. 4(a), a resin layer 42 is formed on an electrically conductive substrate 41. For example, a metal substrate including copper, nickel, stainless steel or the like, or a silicon substrate sputtered with a metal material such as titanium or chromium or the like is used as the electrically conductive substrate. As the resin layer, a resin material mainly including poly methacrylate such as polymetyl methacrylate (PMMA), or a chemically amplified resin material sensitive to X ray is used. The thickness of the resin layer can be freely set in accordance with the thickness of a spring portion of a micro terminal to be formed and can be set to 100 μm–500 mm, for example.

Then, a mask 43 is disposed on a resin material 42 and X ray 44 is applied through mask 43. As the X ray, SR light is preferable. Mask 43 includes a X ray absorbing layer 43a and a light penetrable substrate 43b formed in accordance with a pattern of a spring portion of a contactor. Silicon nitride, silicon, diamond, titanium or the like is used for light penetrable substrate 43b. For X ray absorbing layer 43a, a heavy metal such as gold, tungsten, tantalum or a compound thereof is used. Of resin layer 42, a resin layer 42a is exposed and modified by the application of X ray 44, while a resin layer 42b is not exposed due to X ray absorbing layer 43a. Accordingly, only a portion 42a modified by X ray 44 is removed by development to obtain a resin mold 42b shown in FIG. 4(b).

Then, electroforming is performed to deposit a metal material 45 at resin mold 42b, as shown in FIG. 4(c). Electroforming means to form a layer including a metal material on an electrically conductive layer using a metal ion solution. By electroforming using electrically conductive substrate 41 as a plating electrode, metal material 45 can be deposited at resin mold 42b. When the metal material is deposited to almost fill a vacancy portion of the resin mold, a spring can be obtained from the deposited metal material layer. When the metal material is deposited higher than the height of the resin mold and over the resin mold, a metal micro structure having a vacancy portion can be obtained by removing the resin mold and the substrate. The structure obtained can be effectively used as a metal mold in a fabrication method according to the present invention using a metal mold as described below. Although nickel, copper or an alloy thereof is used for the metal material, for example, nickel or a nickel alloy such as nickel-manganese is preferable to increase resistance to wear.

After electroforming, a predetermined thickness is obtained by polishing or grinding (FIG. 4(d)). Then, a resin layer 46 including a negative resist, for example, is formed on the spring (FIG. 4(e)). When UV 47 or X ray is applied through mask 48, of resin layer 46, a resin layer 46b is exposed, while a resin layer 46a is not exposed (FIG. 4(f)). Accordingly, when a portion cured by UV or the like is left and other portion is removed by development, a resin mold 46b is obtained (FIG. 4(g)). For mask 48, a mask of specifications similar to mask 43 can be used.

Then, a layer including a metal material is electroformed at resin mold 46b and the plating is grown to form a protrusion 49 protruding outwardly. As shown in FIG. 4(h), protrusion 49 has a contact surface with an electrode forming a part of a paraboloid of revolution. A protrusion having a contact surface forming a part of a sphere (not shown) can be also formed. In electroforming, lines of electric force are extended in the vacancy portion of resin mold 46b and equivalent points of electric force form a sphere or a paraboloid of revolution. Accordingly, when the plating is grown, the surface of the plating can easily form a protrusion that is a part of a sphere or a paraboloid of revolution.

After protrusion 49 is formed, resin molds 42b, 46b are removed by wet etching or plasma ashing (FIG. 4(i)), and then electrically conductive substrate 41 is removed by wet etching using an acid or alkali or mechanically to obtain a contactor having a columnar spring 45 and protrusion 49 according to the present invention shown in FIG. 4(j). In order to increase conductivity with an electrode of an electronic device and the like, preferably, a micro terminal including the obtained contactor is provided with a coat layer of 0.05–1 μm in thickness formed by barrel plating which includes a precious metal such as Au, Rh, Ag, Ru, Pt, Pd or the like, or an alloy of a precious metal such as palladium-cobalt, or polytetrafluoroethylene gold. A coat layer of polytetrafluoroethylene gold can be formed by composite plating of polytetrafluoroethylene and gold. The coat layer can be also formed in a process before a substrate is removed (FIG. 1(i)).

Figure 8:
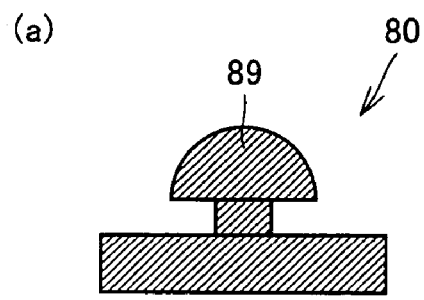
FIG. 8 shows a method of forming a protrusion in the micro terminal according to the present invention.
Figure 8:
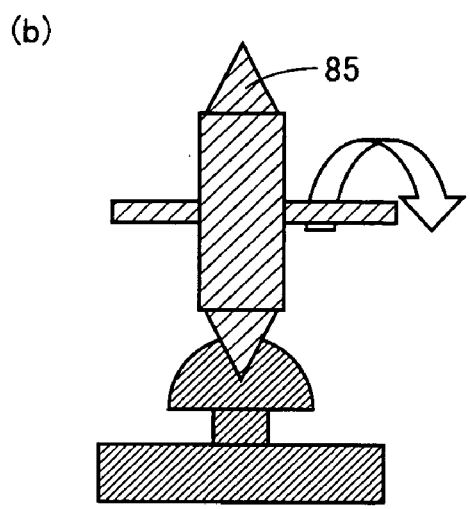
Figure 8:
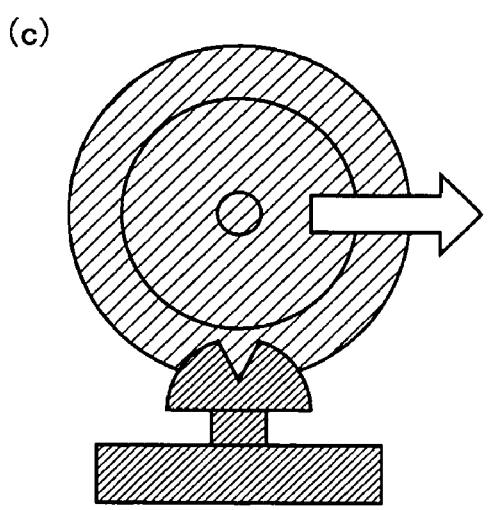

On the protrusion formed at the central portion of the contactor, as shown in FIG. 8, for example, a V-shaped groove can be formed by cutting with a dicer. First, a rotary teeth 85 of a dicer rotating in a direction shown by an arrow (b) is applied to an end of a protrusion 89 of a contactor 80 shown in (a) and then the dicer is moved in a direction orthogonal to the plane of FIG. 8 to form a V-shaped groove on the end of protrusion 89. As shown in (c), if necessary, by applying the rotary teeth of the dicer to the end of the protrusion in a different direction repeatedly and moving the dicer as shown by the arrow, the protrusion can be cut similarly. The groove forming can be performed after forming of a protrusion, before or after removing the resin molds, or before or after removing the electrically conductive substrate. The contactor according to the present invention can be fabricated on a substrate at one time in large number. Accordingly, the contactor can be produced in large amount by dicing the contactor formed on the substrate, reducing manufacturing cost.

Figure 3:
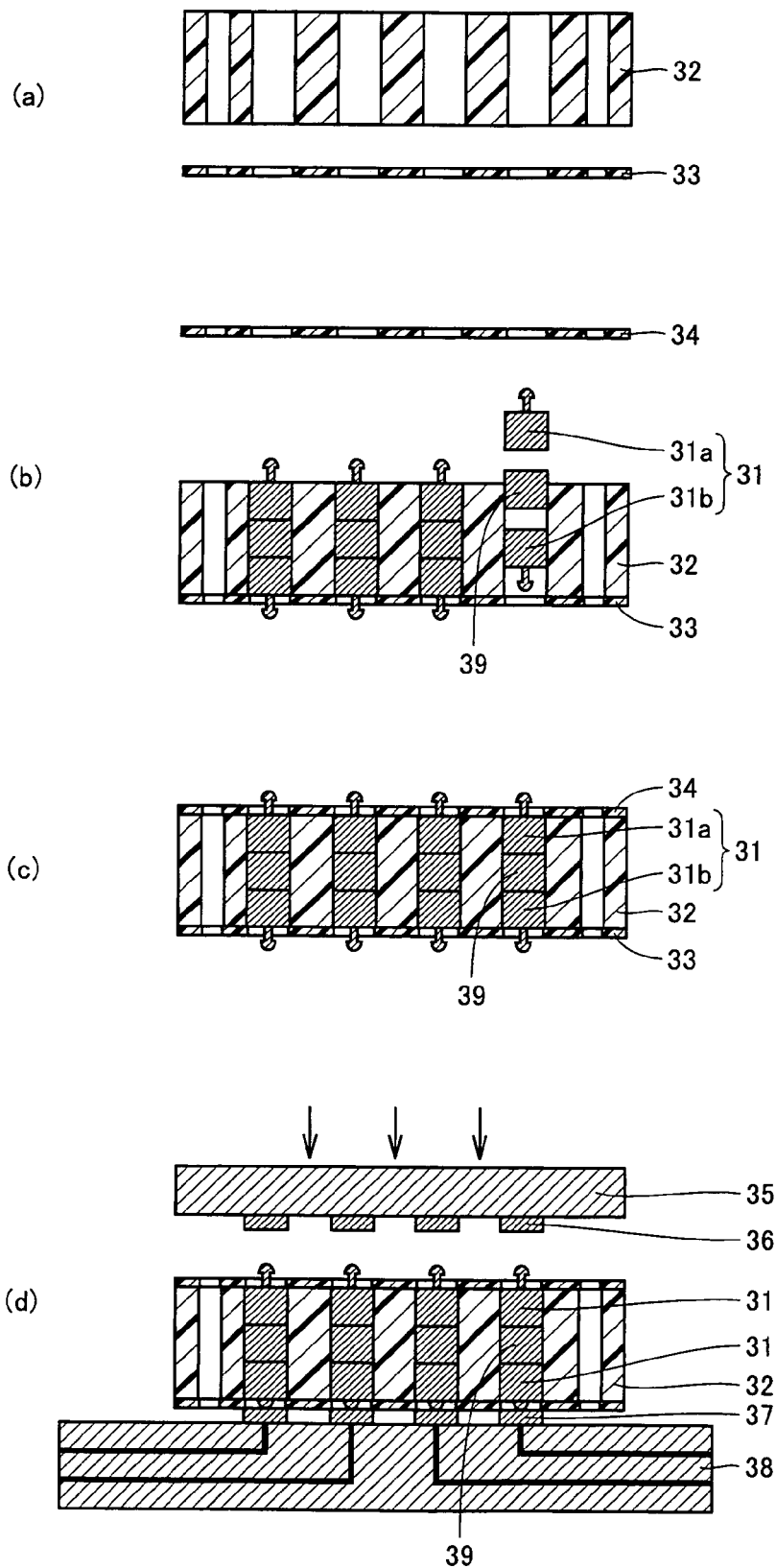
FIG. 3 shows processes of a method of fabricating a socket for inspection according the present invention.

FIG. 3 shows a method of fabricating a socket for inspection from the contactor obtained. A connector for installation can be fabricated similarly. The method of fabricating a socket for inspection or a connector for installation is not limited to the method shown in FIG. 3, however, the method shown in the FIG. 3 is preferable since fabrication is easy. First, as shown in FIG. 3(*a*), a through hole is formed on an electrically insulating substrate 32 in accordance with a position of an electrode of semiconductor to be inspected. The size of the through hole is adapted to the outer diameter of a micro terminal to be accommodated. Then, an electrically insulating lower lid sheet 33 similarly formed with a through hole in accordance with an arrangement of an electrode of semiconductor is adhered to substrate 32. The size of the through hole of the lower lid sheet is made smaller than the outer diameter of a micro terminal to be accommodated to prevent the micro terminal from being detached from the substrate.

Then, as shown in FIG. 3(*b*), a pair of contactors 31*a*, 31*b* oriented back to back with the protrusion of contactor 31 facing outwardly and having a hollow ring 39 interposed therebetween is fitted into the through hole on substrate 32. Then, an upper lid sheet 34 similar to lower lid sheet 33 is adhered to substrate 32 to fix contactor 31 and hollow ring 39, and a socket for inspection according to the present invention is obtained. Material for substrate 32, lower lid sheet 33 and upper lid sheet 34 can be selected arbitrarily from an electrically insulating material such as polyimide resin, commonly used fiber reinforced resin (FRP) or the like.

Figure 9:
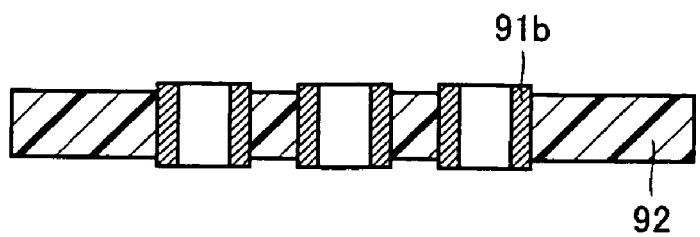
FIG. 9 shows processes of a method of fabricating a contact sheet according to the present invention.
Figure 9:
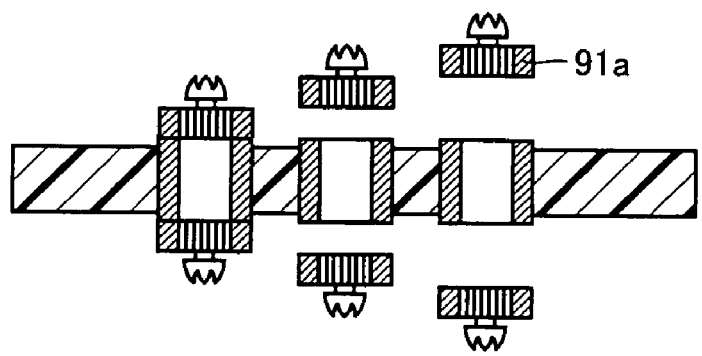
Figure 9:
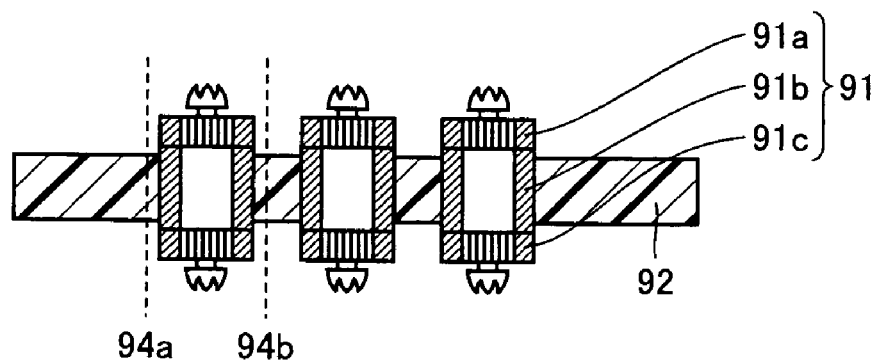

FIG. 9 shows another method of fabricating a contact sheet of a socket for inspection or a connector for installation or the like. First, as shown in (a), a through hole is formed on a sheet 92 in accordance with a position of an electrode to be connected. Then, a through electrode 91*b* is fitted into sheet 92. As shown in (b), a pair of contactors oriented back to back with the protrusion of contactors 91*a*, 91*c* facing outwardly is then joined to hollow electrode 91*b* to obtain a contact sheet according to the present invention shown in (c).

Preferably, the hollow electrode and the contactor are joined by resistance welding. When using resistance welding, it is not necessary to consider the flow of molten solder and the pitch of micro terminals can be made narrower, compared to when using joining by solder. Since mechanical strength of the joined portion is larger and resistance to heat and a chemical agent is higher compared to soldering, longer lifetime is provided. Further, higher accuracy can be obtained since there is no deviation in position due to deformation of a middle layer and stress as occurs when soldering is used.

For sheet 92, polyimide resin, commonly used fiber reinforced resin (FRP) or the like can be used. Micro terminal 91 according to the prevent invention is a micro structure with an outer diameter of not more than 1 mm. Since fabrication by the methods shown in FIGS. 3 and 9 is easy, a micro terminal according to the present invention can be fabricated easily, efficiently and at lower cost by performing punching processing in broken lines 94*a*, 94*b* once a contact sheet shown in FIG. 9(*c*) is formed.

Another method of fabricating a micro terminal according to the present invention is characterized in that a contactor in the micro terminal is fabricated by a method including the steps of: forming a resin mold by a metal mold; forming a layer including a metal material at the resin mold on an electrically conductive substrate by electroforming, polishing or grinding; forming a resin mold on the layer including a metal material by lithography; electroforming a layer including a metal material at the resin mold to form a protrusion protruding outwardly; removing the resin molds; and removing the electrically conductive substrate. With this method also, similarly to the above-described fabrication method of forming a contactor by X-ray lithography, the micro terminal can be fabricated accurately with high reproducibility. Since the fabricated contactor has high aspect ratio and the central protrusion can be formed accurately, contact reliability is high. Further, advantageously, the contactor can be fabricated in large amount using the same metal mold.

Figure 5:
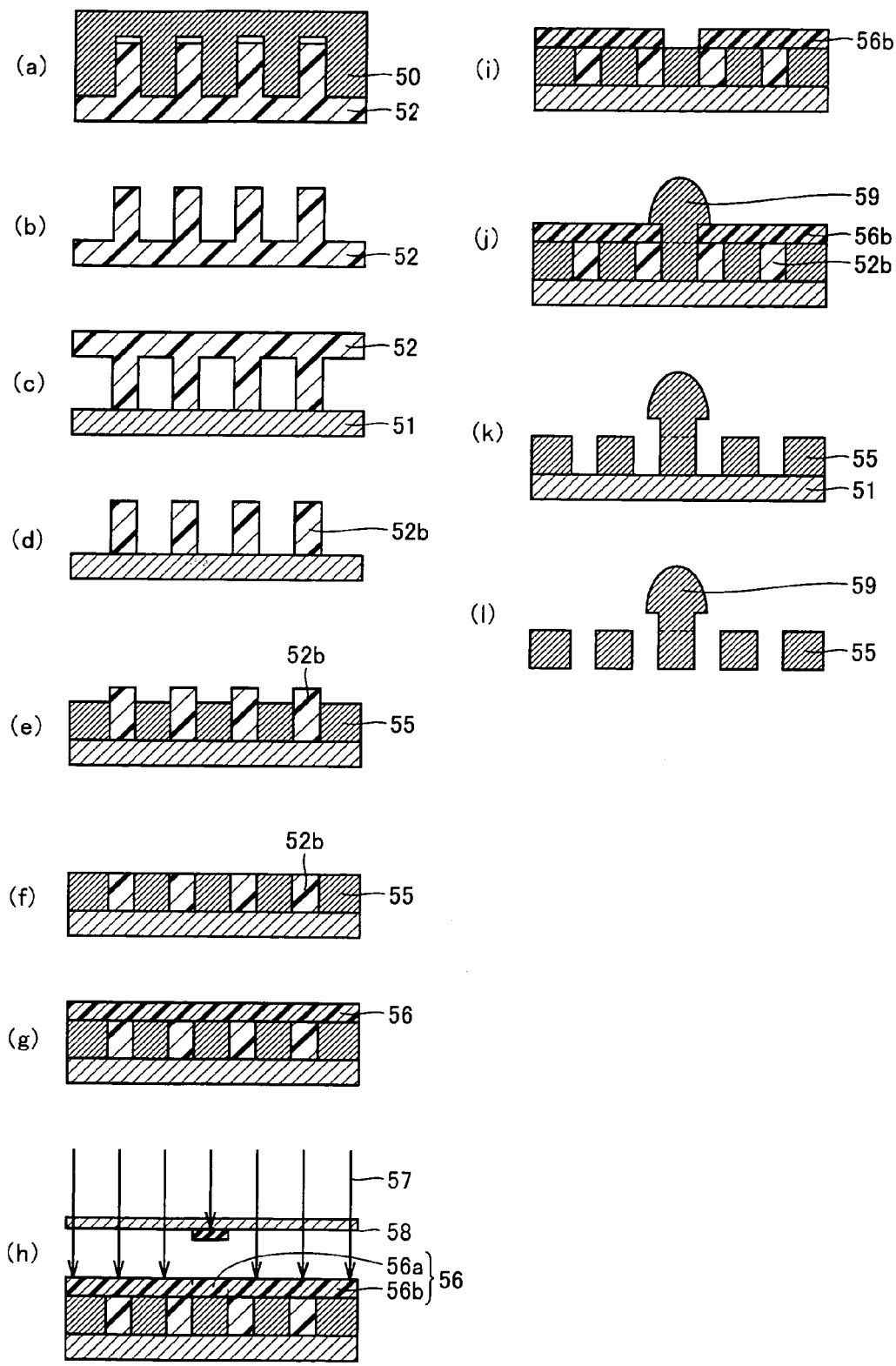
FIG. 5 shows processes of a method of fabricating the contactor in the micro terminal according to the present invention.

As shown in FIG. 5(*a*), a metal mold 50 having a convex portion is used to form a concave resin mold 52 by molding such as press or injection molding. For resin, a thermoplastic resin such as acrylic resin like polymetyl methacrylate, polyurethane resin, polyacetal resin like polyoxy methylene is used. Preferably, metal mold 50 is fabricated by the above-describe method combining X-ray lithography and electroforming, since the metal mold is a metal micro structure similar to the micro terminal according to the present invention.

After turned upside down, resin mold 52 is adhered to an electrically conductive substrate 51, as shown in FIG. 5(*c*). Then, as shown in FIG. 5(*d*), resin mold 52 is polished to form a resin mold 52*b*. After that, similarly to the above, a metal material 55 is deposited at resin mold 52*b* by electroforming (FIG. 5(*e*)), a uniform thickness is provided by polishing or grinding (FIG. 5(*f*)), a resin layer 56 is formed (FIG. 5(*g*)), and UV 57 or X ray is applied through a mask 58. Of resin layer 56, resin layer 56*b* is exposed while a resin layer 56*a* is not (FIG. 5(*h*)), so that a resin mold 56*b* can be obtained by leaving a portion cured by UV or the like by development and removing other portion (FIG. 5(*i*)).

Then, by electroforming to grow the plating, a protrusion 59 shown in FIG. 5 (*j*) having a contact surface with an electrode being a part of a paraboloid of revolution or the like is formed. After protrusion 59 is formed, by removing resin molds 52*b*, 56*b* (FIG. 5(*k*)) and removing electrically conductive substrate 51, a contactor having a columnar metal material 55 and protrusion 59 can be fabricated (FIG. 5(*l*)). Preferably, the micro terminal is provided with a coat layer by Au, Rh or an alloy thereof or the like.

EXAMPLE 1

As shown in FIG. 4(*a*), resin layer 42 was formed on electrically conductive substrate 41. For the electrically conductive layer, a silicon substrate sputtered with titanium was used. The resin layer was formed by copolymer of methyl methacrylate and methacrylate. The thickness of the resin layer was 200 μm.

Then, mask 43 is disposed on resin layer 42 and X ray 44 was applied via mask 43. X ray was SR light. For mask 43, a light penetrable substrate 43b with a X ray absorbing layer 43a including tungsten nitride formed thereon was used. X ray absorbing layer 43a was formed in accordance with a pattern of a contactor.

After the application of X ray 44, development was performed with methyl isobutyl ketone and a portion 42a modified by X ray 44 was removed to obtain resin mold 42b shown in FIG. 4(b). Then, by electroforming, as shown in FIG. 4(c), metal material 45 was deposited at a vacancy portion of resin mold 42b. For the metal material, nickel was used.

After electroforming, an uneven portion on the surface was removed by polishing to provide a uniform thickness (FIG. 4(d)). Then, resin layer 46 was formed (FIG. 4(e)) and UV 47 was applied via mask 48 (FIG. 4(f)). A UV resist (SU-8 manufactured by Micro Chemical Corporation) was used for resin layer 46. The thickness of resin layer 46 was 50 μm. A commonly used photo-mask was used for mask 48. Then, a portion except for a portion cured by the UV application was removed by development to obtain resin mold 46b having a hole in its center (FIG. 4(g)).

Then, by electroforming to grow the plating metal to the height of 50 μm above the top surface of resin mold 46b, protrusion 49 protruding outwardly was formed (FIG. 4(h)). After protrusion 49 was formed, resin molds 42b, 46b were removed by plasma ashing (FIG. 4(i)), and a contactor with a protrusion was mechanically detached from electrically conductive substrate 41 (FIG. 4(j)). Then, a coat layer (not shown) including gold of 0.1 μm in thickness was formed by barrel plating. The contactor may be detached from the substrate by etching the electrically conductive substrate. The total height of the protrusion formed on the spring was 100 μm.

FIG. 1 shows the obtained contactor. The contactor had columnar spring 1u and protrusion 1t protruding outwardly at center 1uc of spring 1u. Protrusion 1t included a contact surface 1tc with an electrode and contact surface 1t was a part of a paraboloid of revolution in shape. Spring 1u had perimeter portion 1ug having a tubular ring structure and was 480 μm in diameter D. The thickness b of the spring was 150 μm and the width a of the spring was 10 μm and the aspect ratio (b/a) was 15. The number of spirals was 3.3 and a stroke was 100 μm. At the central portion of the spiral spring was a protrusion with a neck and having a height c of 100 μm.

As shown in FIG. 3(a), substrate 32 and lower lid sheet 33 formed with a through hole respectively were adhered at the position of an electrode of semiconductor to be inspected. For substrate 32, a substrate formed of polyimide resin and 500 μm in thickness was used and a through hole of 500 μm in diameter was provided. For lower lid sheet 33, a sheet formed of polyimide resin and 20 μm in thickness was used and a hole of 400 μm in diameter was formed in accordance with the position of the through hole of substrate 32.

As shown in FIG. 3(b), contactors 31a, 31b oriented back to back with the protrusion facing outwardly and having hollow ring 39 of 480 μm in outer diameter and 200 μm in height interposed therebetween were fitted into the through hole of substrate 32. Then, lower lid sheet 33 and similar upper lid sheet 34 were adhered to substrate 32 to obtain a socket for inspection according to the present invention shown in FIG. 3(c).

As shown in FIG. 3(d), the obtained socket for inspection was mounted on electrode 37 of transformer 38 of an inspection device. Semiconductor 35 as a body to be inspected was disposed on the inspection device and was applied pressure with a force of 70 mN in the direction shown by the arrow. Then, due to urging force of the spring, electrical conduction was obtained between planar electrode 36 of semiconductor 35 and electrode 37 of transformer 38 and inspection of semiconductor could be performed based on the obtained electrical signal.

Although diameter D of the micro terminal was 480 μm in the present example, a micro terminal of around 100 μm in diameter D can be also fabricated by the method according to the present invention. Therefore, it was found that higher density installation of electronic devices could be addressed.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

With the present invention, a socket for inspection and a connector for installation including a micro terminal with high connection reliability can be provided.

The invention claimed is:

1. A micro terminal with electrical conduction between said micro terminal and an electrode of an electronic device or an inspection device, comprising a columnar contactor in contact with the electrode, wherein
    said contactor has a plate-shaped spring structure that is elastically deformed by being pressed against the electrode, a perimeter portion of said spring structure has a tubular ring structure, and said contactor has a protrusion protruding outwardly at its end in contact with the electrode, and
    said protrusion is shaped to have a part of a sphere or a paraboloid of revolution.

2. The micro terminal according to claim 1, wherein said contactor has a spiral spring structure.

3. The micro terminal according to claim 1, wherein said micro terminal has said contactor at each of opposing ends in contact with the electrode.

4. The micro terminal according to claim 1, wherein said protrusion has a V-shaped groove opening toward the direction in which said protrusion protrudes.

5. The micro terminal according to claim 1, wherein said micro terminal includes nickel or a nickel alloy.

6. The micro terminal according to claim 1, wherein said micro terminal has a coat layer including a precious metal or an alloy of a precious metal or polytetrafluoroethylene gold.

7. A contact sheet including the micro terminal according to claim 1, having a hollow electrode penetrating the sheet in a thickness direction and said contactor on said hollow electrode, wherein said hollow electrode has a hollow portion for a spring of said contactor to make a stroke.

8. The contact sheet according to claim 7, wherein said hollow electrode and said contactor are joined by resistance welding.

9. A socket for inspection including the micro terminal according to claim 1, wherein said socket is used for inspection of semiconductor in land grid array arrangement.

10. An inspection device including the socket according to claim 9.

11. A method of inspecting semiconductor using the socket according to claim 9.

12. A connector for installation including the micro terminal according to claim 1, wherein said connector is connected to a land electrode.

13. An electronic device including the connector according to claim 12.

* * * * *